United States Patent
Obstfeld et al.

(10) Patent No.: US 12,058,024 B1
(45) Date of Patent: Aug. 6, 2024

(54) DISTRIBUTED LEDGER NETWORK DISCOVERY AND CROSS-INSTANCE DATA ROUTING

(71) Applicant: Cisco Technology, Inc., San Jose, CA (US)

(72) Inventors: Joel A. Obstfeld, Hertfordshire (GB); Oliver James Bull, Bristol (GB); Louis Gwyn Samuel, Wiltshire (GB); Andrew Pletcher, Scotts Valley, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 18/360,360

(22) Filed: Jul. 27, 2023

(51) Int. Cl.
| | |
|---|---|
| *H04L 29/06* | (2006.01) |
| *H04L 9/06* | (2006.01) |
| *H04L 29/08* | (2006.01) |
| *H04L 45/02* | (2022.01) |
| *H04L 45/44* | (2022.01) |
| *H04L 45/741* | (2022.01) |
| *G06F 16/23* | (2019.01) |
| *G06Q 20/38* | (2012.01) |

(52) U.S. Cl.
CPC ............ *H04L 45/02* (2013.01); *H04L 45/44* (2013.01); *H04L 45/741* (2013.01)

(58) Field of Classification Search
CPC ....... H04L 45/02; H04L 45/44; H04L 45/741; H04L 29/06; H04L 9/06; H04L 29/08; G06Q 20/38; G06F 16/23
USPC ........................................................ 709/238
See application file for complete search history.

(56) References Cited

U.S. PATENT DOCUMENTS

| | | | | |
|---|---|---|---|---|
| 10,063,572 | B2* | 8/2018 | Milazzo | H04L 63/1416 |
| 2016/0149769 | A1 | 5/2016 | Joshi et al. | |
| 2018/0130050 | A1 | 5/2018 | Taylor et al. | |
| 2019/0215565 | A1* | 7/2019 | Webb | H04N 21/44226 |
| 2019/0342084 | A1 | 11/2019 | Mehedy et al. | |
| 2020/0005403 | A1* | 1/2020 | Patterson | G07F 13/00 |
| 2020/0118094 | A1 | 4/2020 | Haldenby et al. | |
| 2020/0184470 | A1 | 6/2020 | Singh et al. | |
| 2020/0342394 | A1 | 10/2020 | Moore et al. | |
| 2020/0372015 | A1* | 11/2020 | Baird, III | H04L 9/14 |
| 2021/0144196 | A1* | 5/2021 | Thurimella | H04L 63/126 |
| 2021/0194700 | A1 | 6/2021 | Moy et al. | |
| 2021/0312088 | A1 | 10/2021 | Choi | |

(Continued)

OTHER PUBLICATIONS

Trossen, et al., "Impact of Distributed Ledgers on Provider Networks," Industry IoT Consortium, Whitepaper, Jan. 10, 2022, 20 pages.

(Continued)

*Primary Examiner* — Jude Jean Gilles
(74) *Attorney, Agent, or Firm* — Edell, Shapiro & Finnan, LLC (57) ABSTRACT

Methods are provided which involve obtaining information about a distributed ledger instance associated with an enterprise and generating at least one announcement that advertises a presence of the distributed ledger instance based on the information. The methods further involve providing the at least one announcement to one or more network devices associated with other distributed ledger instances to provide visibility of the distributed ledger instance to the other distributed ledger instances.

20 Claims, 7 Drawing Sheets

(56) References Cited

U.S. PATENT DOCUMENTS

2022/0092686 A1 3/2022 Sekar et al.
2022/0217113 A1 7/2022 Khan et al.

OTHER PUBLICATIONS

"Seamlessly Connected Blockchains," Layer Zero, https://layerzero.network, retrieved from the Internet on May 5, 2023, 4 pages.
Connext Labs, "Welcome to the Connext Docs," https://docs.connext.network/, May 5, 2023, 3 pages.
McBride, M., et al., "BGP Blockchain," Workgroup: Network Working Group, Internet-Draft: draft-mcbride-rtgwg-bgp-blockchain-02, https://datatracker.ietf.org/doc/draft-mcbride-rtgwg-bgp-blockchain/, Published: Mar. 6, 2023, 13 pages.
Preethi Kasireddy, "The Architecture of a Web 3.0 application," https://www.preethikasireddy.com/post/the-architecture-of-a-web-3-0-application, Sep. 22, 2021, 31 pages.
Cloudflare, "Your Gateway to Web3," Easy access to IPFS and Ethereum networks, retrieved from https://www.cloudflare.com/application-services/products/web3/ on Jul. 26, 2023, 9 pages.
Settlemint, "Blockchain Made Easy.," Blockchain Application Development Platform, retrieved from https://www.settlemint.com/, on Jul. 26, 2023, 26 pages.
Tenderly, "Enabling Web3 developers to build, test, monitor, and operate smart contracts from their inception to mass adoption.," Ethereum Development Platform, retrieved from https://tenderly.co/, Jul. 26, 2023, 11 pages.
Kaleido, "Your Web3 Platform for Blockchain & Digital Assets," Enterprise-Grade Blockchain & Digital Asset Platform, retrieved from https://www.kaleido.io/, on Jul. 26, 2023, 9 pages.
Wang, Q., et al., "Exploring Web3 From the View of Blockchain," (Tech Report), https://www.researchgate.net/publication/361416088_Exploring_Web3_From_the_View_of_Blockchain, Jun. 17, 2022, 38 pages.
Metamask, "A crypto wallet & gateway to blockchain apps," retrieved from https://metamask.io/, on Jul. 26, 2023, 10 pages.
Middleware, "Web3 observability: How to monitor Web3 applications," https://middleware.io/blog/web3-observability/, Dec. 6, 2022, 22 pages.

* cited by examiner

DISTRIBUTED LEDGER NETWORK DISCOVERY AND CROSS-INSTANCE DATA ROUTING

TECHNICAL FIELD

The present disclosure generally relates to data networks and storage systems.

BACKGROUND

Web3 is an idea for a new iteration of the World Wide Web which incorporates concepts such as decentralization, blockchain technologies, and token-based systems. In contrast to previous paradigms (e.g., Web 2.0), data and content are decentralized rather than stored in centralized databases or provided by centralized servers. Web3 technologies may include decentralized ledgers, smart contracts, and distributed/decentralized applications ("dApps") that can execute code. In the case of decentralized ledgers such as blockchains, data is stored in an immutable and attestable manner. Decentralized or distributed ledgers are used for a variety of application scenarios including applications in the health care, Internet of Things (IoT), data management systems, etc. There are many distributed ledgers in operation today, some are used in a public context while others are private and not visible to an outside world.

DESCRIPTION OF EXAMPLE EMBODIMENTS

Overview

Presented herein are techniques for distribute ledger network discovery and cross-instance data routing. The techniques identify and advertise distributed ledger instances and provide for routing information between the distributed ledger instances.

In one form, a method is provided, which involves obtaining information about a distributed ledger instance associated with an enterprise and generating at least one announcement that advertises a presence of the distributed ledger instance based on the information. The method further involves providing the at least one announcement to one or more network devices associated with other distributed ledger instances to provide visibility of the distributed ledger instance to the other distributed ledger instances.

EXAMPLE EMBODIMENTS

Distributed Ledgers (such as blockchains) include multiple nodes i.e., computational instances, which operate a consensus mechanism. The consensus mechanism collectively validates and verifies changes in state, which are then written to the ledger. As noted above, there are many distributed ledgers in operation today. Some distributed ledgers are public and are open for use by any users. For example, public ledgers are often referred to by their protocol name such as Ethereum, Polygon, etc.

Some distributed ledgers operate in private context i.e., private distributed ledgers. Private distributed ledgers are often used by enterprises for specific purposes and are typically between specific sets of enterprise entities e.g., Hyperledger. A private distributed ledger may include a unique identification number that is known to a set of entities e.g., typically 2 or 3 entities. For example, in product management systems, a first private distributed ledger may be setup between a supplier and an assembler (first and second enterprises) and a second private distributed ledger maybe setup between a supplier and freight enterprise responsible for delivering items to the assembler that assembles items to manufacture a product. While private ledgers serve to connect a specific set of entities for a specific purpose, as with many networks, utility and value may be achieved if the number of members within the network increases. As with data communication networks, the greater the number of connected networks, the greater the potential utility.

Private distributed ledgers, however, are discrete, isolated instances. With respect to the example above, the assembler cannot view data from the first private distributed ledger and does not even know of its existence. However, by accessing data from the first private distributed ledger, the assembler may learn of shipment delays and plan accordingly. Further, if the supplier retains another freight enterprise for delivering items to the assembler, a third private distributed ledger between the supplier and another freight enterprise is to be set up. Cross-instance data routing from these various private ledgers would greatly benefit these entities and improve productivity and efficiency.

Moreover, even public distributed ledgers may not be entirely accessible to users and some may be permissioned access only. It would be beneficial for users to learn of their existence and possibly obtain data from these permissioned portions of the public distributed ledgers.

The techniques presented herein provide a mechanism that enables identification, advertisement, and routing of data between distributed ledger instances. Specifically, the techniques presented herein provide a method of identifying, advertising, and enabling routing of data between privately-operated distributed ledger instances of various enterprises. A distributed ledger may be considered as a private data communication network (e.g., LAN) and the method connects these private distributed ledgers to one another.

While one or more example embodiments presented below describe a product management system, this is just one example. The techniques apply to various data management networks and systems depending on a particular deployment and use case scenario. The techniques are not limited to private distributed ledgers but may also apply to public distributed ledgers i.e., public blockchains that have permissions and/or access control.

Distributed ledgers are commonly used to store data associated with providing Web3 services. The term "Web3" denotes a collection of technologies and network models that collectively provide a decentralized approach in contrast to the prevailing centralized model of systems and solutions. In a centralized model, services are provided at the discretion of a single administrative entity. Conversely, in a decentralized model, services are delivered through the collaborative efforts of various administrative entities without a singular point of ownership or control. The primary objective of Web3 is to facilitate the creation of services composed of logical infrastructure offered by diverse administrative entities.

In such an environment, a set of technologies is used to establish trust and assurance concerning the operation and execution of services. This entails fostering trust and assurance among administrative entities offering logical infrastructure, as well as ensuring trust and assurance for the users of the resulting services. This set of technologies may encompass distributed ledgers, consensus mechanisms, payment methods for service exchanges, decentralized protocols, and smart contracts. These technologies work in tandem to enable the development of applications and services.

In a Web3 paradigm, distributed ledger technology (DLT) may be employed to provide various services. DLT may be an append-only distributed data structure that includes authenticity and integrity features in which updates (inserts) are to be accepted via a consensus mechanism among validators. Validators may refer to blockchain contribution operators that run a block consensus protocol. Blockchains refer to a type of DLT where the underlying data structure includes a hash chain of blocks of data. Contribution nodes are a component of a distributed ledger that provide compute, storage, and/or bandwidth services for running a DLT, blockchain, or other decentralized service. In DLT, contribution tokens may be a unit of value bound to the action of contributing to a peer-to-peer network running the DLT or blockchain; value tokens may store value and can be traded as assets.

In the context of Web3, a smart contract may include a computer program that is configured to automatically execute, control, or document relevant events and actions according to the terms of a contract or agreement. A DLT may implement smart contracts by including a state machine that can be updated via DLT updates. A DLT may interface with one or more oracles, which are independent entities that provide information into and/or out of the smart contracts; oracles may also validate state and results. A distributed application (dApp) may run on a blockchain, using a DLT to store state, and can utilize smart contract technology. Thus, a dApp is distributed in the sense that a dApp does not use a single central server as a service core.

Figure 1:
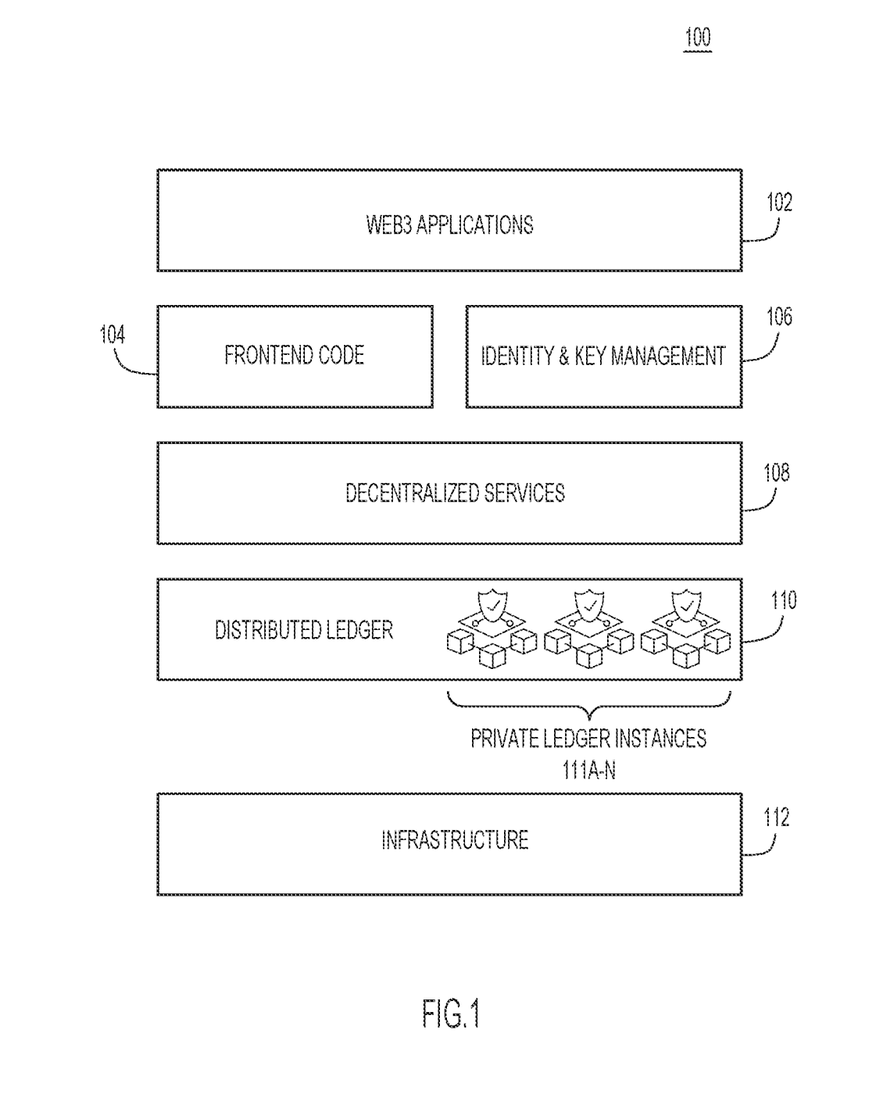
FIG. 1 is a block diagram of a Web3 model for utilizing, supporting, and/or providing Web3 services in which cross-instance data routing for distributed ledgers is enabled, according to an example embodiment.

Example embodiments will now be described in detail with reference to the Figures. Reference is now made to FIG. 1. FIG. 1 is a block diagram of a Web3 model 100 utilizing, supporting, and/or providing Web3 services in which cross-instance data routing for distributed ledgers is enabled, according to an example embodiment.

The Web3 model 100 has various layers, including a Web3 application layer 102, a frontend code layer 104, an identity and key management layer 106, a decentralized services layer 108, a distributed ledger layer 110, and an infrastructure layer 112. It should be appreciated that these layers are non-limiting examples that are provided for the sake of clarity, and may not indicate any particular network topology.

Web3 application layer 102 may include one or more Web3 services that provide utility to end-users. These Web3 services may encompass a wide range of user experiences, use cases, and applications that leverage the benefits of decentralized technologies, and may not be limited to strictly Web3 environments. Some of the prominent use cases and applications may include single or multi-player games, virtual meeting environments, online collaboration tools, social media platforms, collectibles, augmented reality applications, virtual reality applications, cryptocurrency platforms, data management platforms, etc. It is important to note that while these experiences and use cases can be facilitated by Web3 technologies, they are not exclusively dependent on Web3 and can be implemented in other contexts as well.

Frontend code layer 104 for Web3 applications may refer to the application code that runs on client devices, enabling the user interface and interaction with decentralized services. This code can use various languages, such as JavaScript®, Hypertext Markup Language (HTML), and/or Cascading Style Sheets (CSS). Frontend code layer 104 can provide the necessary functionality to interact with decentralized networks, access smart contracts, and handle user interactions. Frontend code layer 104 may include frameworks and libraries that can be utilized to build scalable and modular Web3 front-end applications (e.g., Web3 applications of Web3 application layer 102).

In some example embodiments, frontend code layer 104 provides the structure and content of Web pages, such as user interface elements, including text, buttons, forms, and containers. Frontend code layer 104 can be configured to provide any desired colors, fonts, layouts, and/or other visual properties of a user interface. Thus, frontend code layer 104 may enable the creation of dynamic and interactive user interfaces, facilitating the integration of decentralized functionality, and providing the particular user experience when interacting with Web3 services of the application layer 102 on client devices.

Identity and key management layer 106 provides an infrastructure for managing user identities, cryptographic keys, accounts, certificates, and signing operations within decentralized applications. Identity and key management layer 106 may ensure secure and reliable authentication, authorization, and cryptographic operations.

In some example embodiments, identity and key management layer 106 manages wallets, which are software applications that enable users to securely store and manage their cryptographic keys. These wallets typically employ strong encryption techniques to safeguard private keys and provide convenient interfaces for users to interact with their accounts and assets on decentralized networks.

Identity and key management layer 106 may manage cryptographic keys, which are used for various purposes, including identity verification, digital signatures, encryption, and/or access control. Web3 identity systems often utilize public-key cryptography, where users possess a private key for signing transactions or providing proof of identity, and a corresponding public key for verification purposes.

In some example embodiments, identity and key management layer 106 manages Web3 accounts that are associated with specific identities or entities on decentralized networks. The accounts can be linked to cryptographic key pairs and may serve as the primary mechanism of interaction and ownership within the Web3 ecosystem. Accounts enable users to access and manage their assets, interact with smart contracts, and participate in network activities. Identity and key management layer 106 may manage certificates for enhancing trust and security. Certificates can serve as digital credentials that bind a user's identity to their cryptographic keys, enabling verification and validation of identities in decentralized environments. Certificates can be issued by trusted authorities or implemented through decentralized identity frameworks.

In some example embodiments, identity and key management layer 106 performs signing operations, which may involve using cryptographic keys to generate digital signatures. In Web3 environments, signing is used to ensure data integrity, non-repudiation, and/or secure transactions. By signing messages or transactions with their private keys, users can prove ownership and provide cryptographic proof of authenticity and integrity.

In some example embodiments, identity and key management layer 106 manages authorization and access control to data stored in distributed ledger systems. For example, identity and key management layer 106 may store a cryptographic key to access data and perform transactions over a distributed ledger system that is associated with an enterprise. As another example, the identity and key management layer 106 may be associated with a particular enterprise and/or ledger instance and be used to ensure secure and reliable authentication, authorization for cross-instance data routing.

Decentralized services layer 108 includes multiple disparate entities collaborating to offer various services. These services may include distributed document storage, tokenization, proof-of-existence, distributed computation-as-a-service, distributed communications-as-a-service, distributed ledger indexing and querying, and/or payment and exchange of value.

Distributed document storage enables decentralized storage of files across a network of nodes, ensuring data availability and resilience. Tokenization represents real-world assets or rights as digital tokens, enabling fractional ownership and transferability. Proof-of-existence allows users to prove the integrity and timestamped existence of digital assets. Distributed computation-as-a-service may employ collective computational power for complex tasks, whereas distributed communications-as-a-service may facilitate secure and private communication without centralized intermediaries. Distributed ledger indexing and querying can provide access to data on distributed ledgers. Payment and exchange systems enable decentralized transactions using blockchain technology.

Distributed ledger layer 110 may employ one or more distributed ledgers that include various components and mechanisms to establish trust and assurance between entities in a decentralized environment. Distributed ledger layer 110 may include distributed ledger technologies, consensus mechanisms, layer 1 and layer 2 ledgers, rollups, zero-knowledge proofs, sharding, smart contract code, smart contract execution engines, contribution nodes, validator nodes, peer-to-peer (P2P) communications protocols, contribution tokens, and oracles.

Distributed ledger technologies enable the decentralized storage and management of data across a network of nodes. Consensus mechanisms ensure agreement on the state of the ledger among participating nodes. Layer 1 features utilize methods such as changing the consensus mechanism, forking the chain, and sharding. In contrast, layer 2 services include state channels, nested blockchains, rollups, and sidechains. Rollups may aggregate and process transactions off-chain before committing the transactions to the main chain. Zero-knowledge proofs enable privacy-preserving and verifiable computations. Sharding elements partition the network into smaller groups, enhancing scalability. Smart contract code represents self-executing agreements on the ledger, while smart contract execution engines handle the processing and validation of these contracts.

Distributed ledger layer 110 may include contribution nodes and validator nodes that maintain and secure the network. In some example embodiments, peer to peer (P2P) communications protocols facilitate decentralized communication between nodes. Distributed ledger layer 110 utilizes contribution tokens to incentivize participation and contribution within the network. In some example embodiments, distributed ledger layer 110 includes one or more oracles to provide external data and real-world information to smart contracts or other distributed applications.

For example, the distributed ledger layer 110 may include private ledger instances 111a-n. Each private ledger instance connects a specific set of entities for a specific purpose. In one or more example embodiments, private ledger instances 111a-n are interconnected to route data therein between. That is, other entities and/or private ledger instances 111a-n that are not privy to a particular private ledger instance may still retrieve data therefrom.

The notations 1, 2, 3, ... n a, b, c, ... n "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

Infrastructure layer 112 may include a set of components that form the hardware and/or software that supports decentralized services and models, which may be substantially similar to those found in centralized systems. Infrastructure layer 112 can include compute resources, network infrastructure, telecommunications capabilities, bandwidth availability, processing capacity, hosting services, access mechanisms, security measures, and software frameworks.

Specifically, compute resources may include the hardware and software for data processing and storage such as processor(s), microprocessor(s) and memory. Network infrastructure enables the connectivity and communication between nodes in the decentralized network, and other telecommunication elements may be responsible for the exchange of data and information across different network endpoints. Hosting services can support the deployment and management of decentralized applications and services. Access mechanisms may be provided to enable users to interact with the decentralized infrastructure of various components of Web3 model 100 and its various services. Security measures may be provided to protect data, privacy, and network integrity. Software frameworks may provide the tools and libraries for developing and running Web3 applications in Web3 application layer 102.

Figure 2:
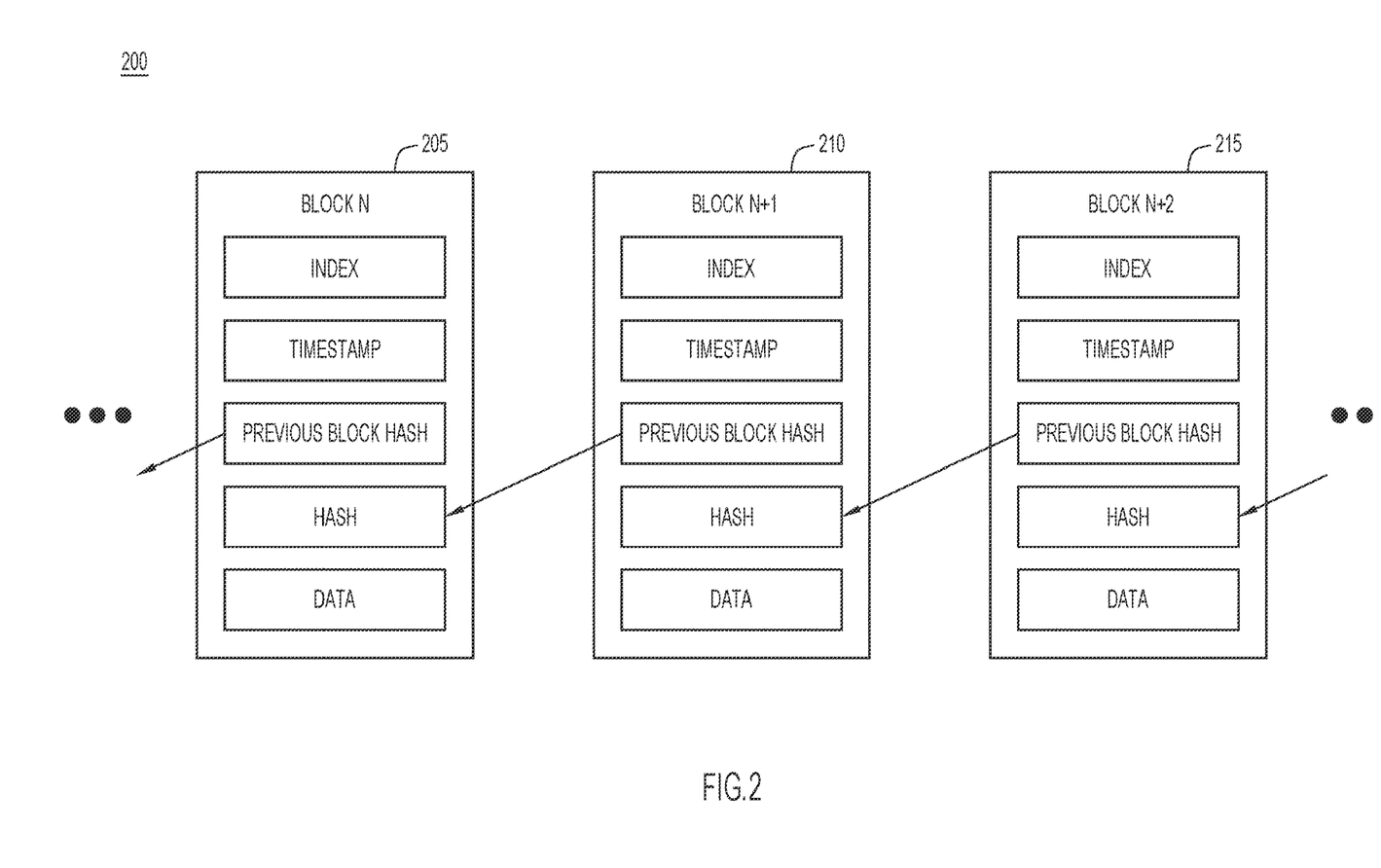
FIG. 2 is a block diagram depicting a distributed ledger for performing or supporting various operations of Web3 services, according to an example embodiment.

With continued reference to FIG. 1, FIG. 2 is a block diagram depicting a distributed ledger 200 for performing or supporting various operations, according to an example embodiment. The distributed ledger 200 can be associated with a smart contract that can write data or information to the distributed ledger 200 in blocks. The distributed ledger 200 is an example of a portion of a particular distributed ledger such as one of private ledger instances 111a-n of FIG. 1. That is, the distributed ledger 200 may correspond to elements that are depicted and described with reference to distributed ledger layer 110 of FIG. 1.

The distributed ledger 200 includes block N (205), block N+1 (210), and block N+2 (215). It should be appreciated that this depiction of the distributed ledger 200 is only a portion of the ledger, and information can be stored as an entry in any block in distributed ledger 200. In one or more example embodiments, distributed ledger 200 is a blockchain, a public permissioned ledger, or a private ledger.

Each block 205-215 may include an index, a timestamp, a previous block hash, a hash, and data. The index of a block includes an identifier for the block, such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 200 is immutable. In some example embodiments, each hash may be a cryptographic hash, and may include a hash of the data stored in its block as well as the data corresponding to the previous block's hash. Thus, once recorded, the data in any given block cannot be altered retroactively without alteration of all subsequent blocks, which involves consensus of the network majority. The data can include any desired data, such as a transaction record, video data, text data, audio data, time-series data, encrypted data, data and corresponding metadata, and the like.

Figure 3:
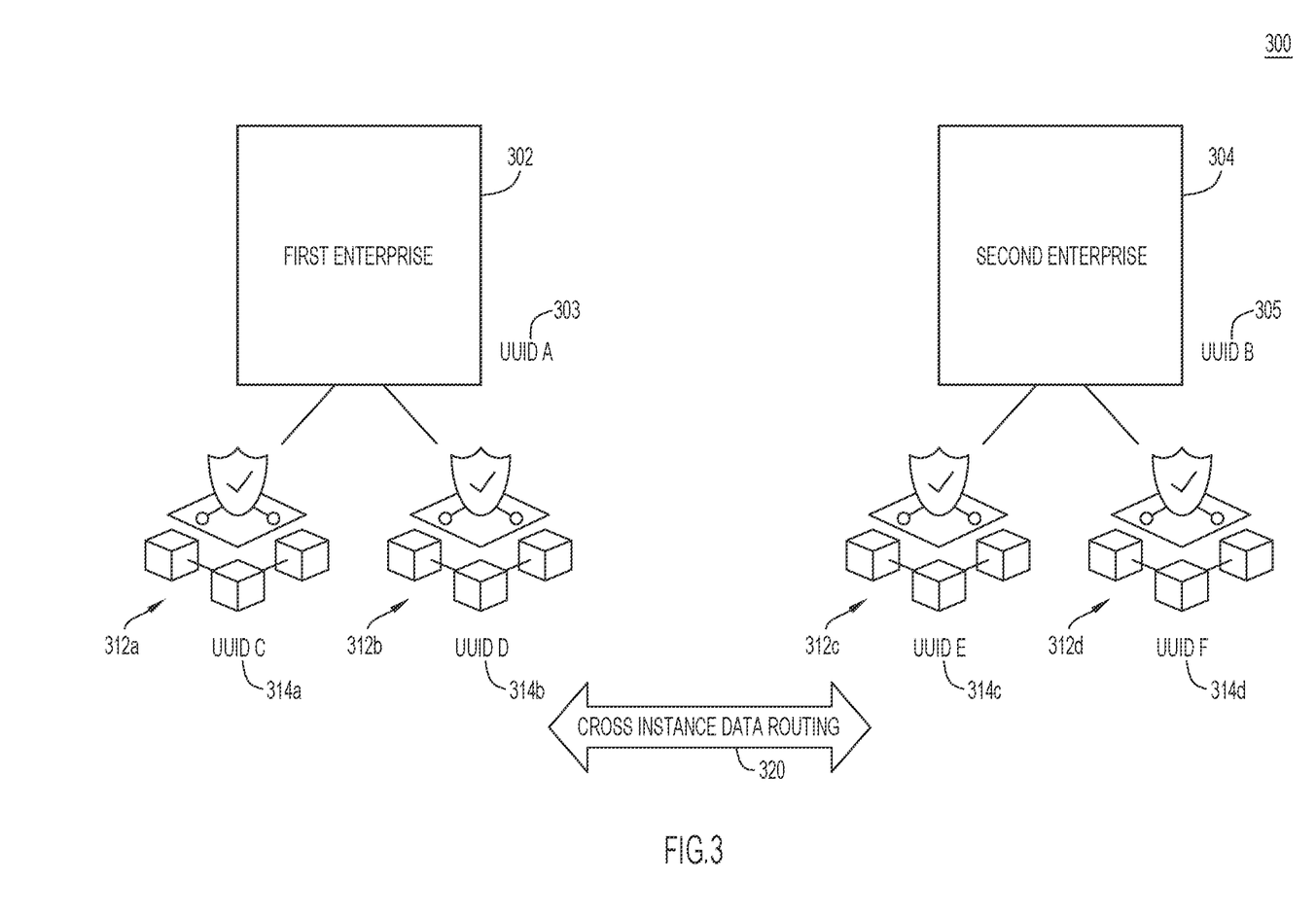
FIG. 3 is a block diagram illustrating a system in which cross-instance data routing between different distributed ledgers is enabled, according to an example embodiment.

With continued reference to FIGS. 1 and 2, FIG. 3 is a diagram illustrating a system 300 in which cross-instance data routing between different distributed ledgers is enabled, according to an example embodiment. The system 300 includes a first enterprise 302 having a first unique identifier 303, a second enterprise 304 having a second unique identifier 305, and distributed ledger instances 312a-d with unique identifiers 314a-d, for which cross instance data routing is enabled, shown at 320.

The first enterprise 302 and the second enterprise 304 are entities that have one or more distributed ledgers e.g., a supplier enterprise and an assembler enterprise. Each enterprise is assigned a unique identifier. For example, a unique identifier may be in a form of a Universally Unique Identifier (UUID) such as the first unique identifier 303 is UUID A and the second unique identifier 305 is UUID B.

The distributed ledgers instances 312a-d may have the same features and capabilities as the private ledger instances 111a-n of the distributed ledger layer 110 of FIG. 1 and/or the distributed ledger 200 of FIG. 2. The distributed ledger instances 312a-d may be different from one another and may not be capable of communicating with or accessing data from one another. That is, without enabling the cross instance data routing at 320, they lack visibility into one another. This lack of visibility may be intentional due to the nature of smart contracts and distributed ledgers. The distributed ledgers instances 312a-d may not be capable of communicating with components, modules, computer programs, and/or devices outside of the environment associated with the respective distributed ledger instance without the cross instance data routing at 320.

The distributed ledger instances 312a-d may include a first distributed ledger 312a and a second distributed ledger 312b, which are associated with the first enterprise 302. For example, the first distributed ledger 312a may relate to a smart contract between the supplier and the assembler and the second distributed ledger 312b may relate to a smart contract between the supplier and the freight enterprise. The distributed ledgers 312a-d may further include a third distributed ledger 312c and a fourth distributed ledger 312d associated with the second enterprise 304. For example, the third distributed ledger 312c may relate to a smart contract between the assembler and supplier and the fourth distributed ledger 312d may relate to a smart contract between the assembler and product distributer. Each of the distributed ledger instances 312a-d store data regarding the respective smart contracts. In one example embodiment, the distributed ledger instances 312a-d are private ledgers of a respective enterprise and/or permissioned public ledgers.

Similarly, within each of the enterprises, each distributed ledger instance is assigned a unique identifier e.g., another UUID. For example, the first distributed ledger 312a is assigned a first ledger unique identifier 314a such as UUID C and the second distributed ledger 312b is assigned a second ledger unique identifier 314b such as UUID D. The third distributed ledger 312c is assigned a third ledger unique identifier 314c such as UUID E and the fourth distributed ledger 312d is assigned a fourth ledger unique identifier 314d such as UUID F.

When cross instance data routing is enabled at 320, the distributed ledger instances 312a-d may gain visibility of each other i.e., may learn about the presence of other ledger instances. To achieve this, a combination of the unique identifier of the enterprise and the ledger unique identifier is advertised to indicate presence of the distributed ledger instance to the outside world (other enterprises and/or other distributed ledger instances). For example, at least one announcement that advertises a presence of a respective distributed ledger instance is generated based on the unique identifiers (information being advertised). A network layer reachability information (NLRI) may be generated to include a tuple that has a first unique identifier of the enterprise and a second unique identifier of the distributed ledger instance. The tuple is a global unique identifier tuple such as <Entity UUID>: <Distributed Ledger Instance UUID>.

In this scheme, to advertise the first distributed ledger 312a, the tuple includes "<UUID A>:<UUID C>". Based on this advertisement, other distributed ledger instances learn that the first distributed ledger 312a is present in the network of the first enterprise 302. Other distributed ledger instances may obtain permissions and access data in the first distributed ledger 312a using the tuple.

With continued reference to FIGS. 1-3, FIG. 4 is diagram illustrating a system 400 for providing visibility of distributed ledgers to other distributed ledgers associated with other entities, according to an example embodiment. The system 400 includes the first enterprise 302 with the first unique identifier 303 is associated with the first distributed ledger 312a and the second distributed ledger 312b, of FIG. 3. The system 400 further includes a first gateway 412a and a second gateway 412b.

Figure 4:
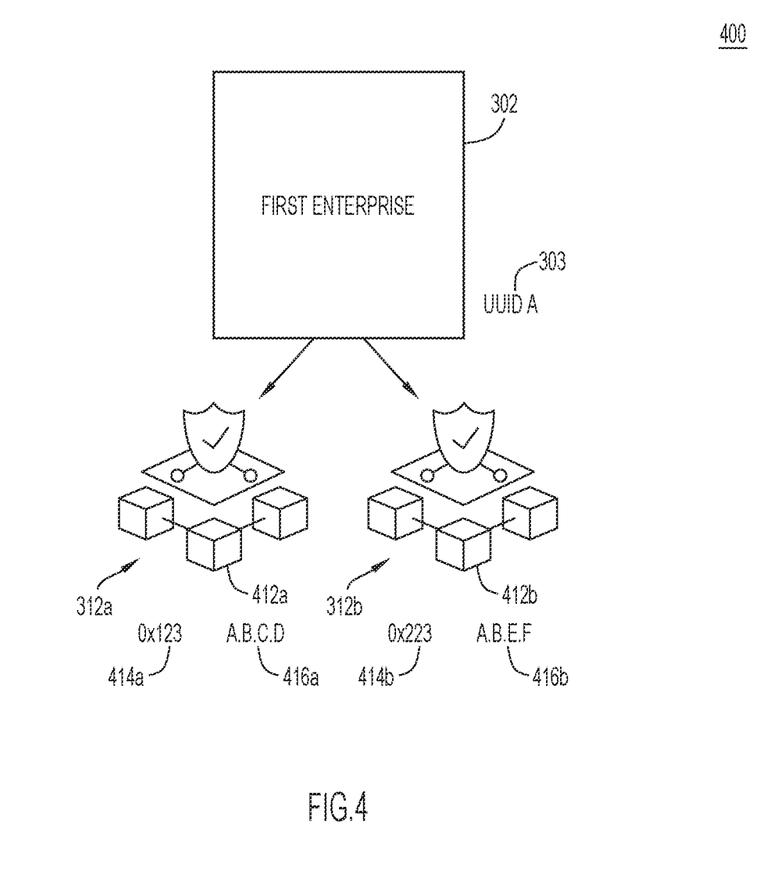
FIG. 4 is a diagram illustrating a system for providing visibility of distributed ledgers to other distributed ledgers associated with other entities, according to an example embodiment.

In one example embodiment, the first gateway 412a and the second gateway 412b are software functions executing on an oracle, for example. The oracle may be independent and interface with the respective distributed ledger to provide information or data into and/or out of the ledger. The oracle can be a computer program that is able to access data from outside of the world or network of the blockchain. The oracle can send data, such as messages regarding the state of the smart contract stored in the distributed ledger and, to locations outside of the world. These software functions on their respective distributed ledgers act as gateways or mechanisms by which information that is destined for the target ledger can be sent. This is in effect, an exit-point from the respective distributed ledger. The first gateway 412a and second gateway 412b are configured to transmit the received information to the target ledger subject to policy, security, etc.

The first gateway 412a and the second gateway 412b serve as a gateway on the first distributed ledger 312a and the second distributed ledger 312b, respectively. The first gateway 412a has a first distributed ledger address 414a such as 0x123 and an Internet Protocol version 4 (a first IPv4 address 416a) such as A.B.C.D. The second gateway 412b has a second distributed ledger address 414b such as 0x223 and a second IPv4 address 416b such as A.B.E.F. This is just one non-limiting example. The first gateway 412a and the second gateway 412b may have other type of addresses i.e., appropriate for a particular distributed ledger protocol implementation and appropriate for a particular network communications e.g., IPv6. By assigning a network address to the first gateway 412a and the second gateway 412b, visibility of the first distributed ledger 312a and second distributed ledger 312b is provided outside of the network of the enterprise 302. The first gateway 412a and the second gateway 412b perform network address translation between the network address e.g., IP address and the distributed ledger address.

Specifically, information or data written to the distributed ledger address may be transferred across to other distributed ledger instances using the IPv4 address (i.e., network address) by performing network address translation. Information or data can be read and actioned upon by the oracle using the distributed ledger address. In other words, the distributed ledger address is an address that is used to access the respective distributed ledger internally, by the enterprise and/or entities that are privy to a particular ledger instance. The network address is used by the outside world to reach the respective gateway. Gateways are thus configured to provide information about their respective private distributed ledger. In one example embodiment, the gateway may be hosted on a device that has access to the enterprise's network. The enterprise network may execute IPv4 networking protocol and is connected to the Internet. The first gateway 412a and the second gateway 412b are effectively configured to perform network address translation (NAT) between their IP network address and distributed ledger address.

With continued reference to FIGS. 1-4, FIG. 5 is a diagram illustrating a system 500 in which presence of one or more private distributed ledgers of an enterprise network is advertised for exchanging data between private distributed ledgers associated with different enterprises, according to an example embodiment.

Figure 5:
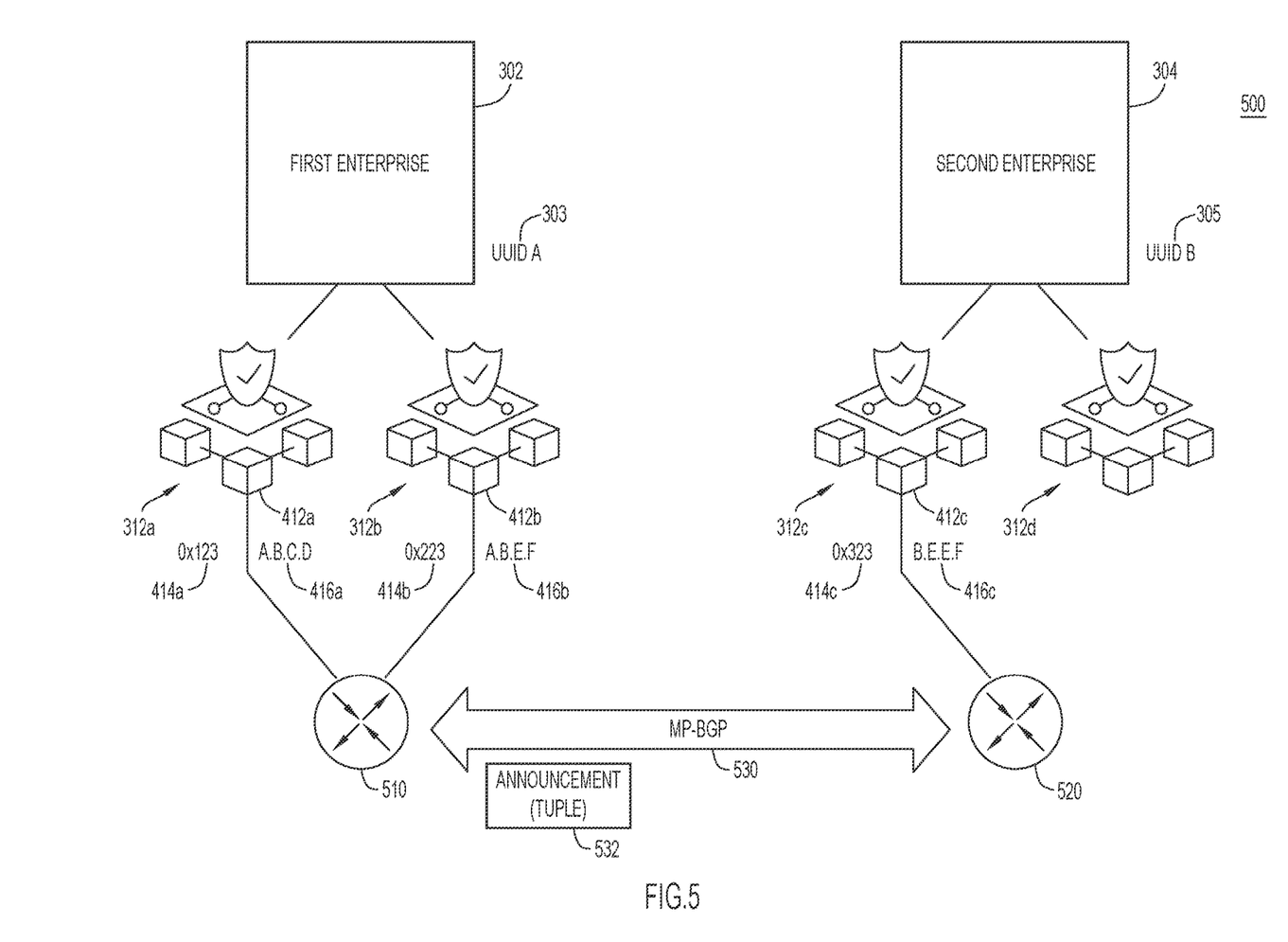
FIG. 5 is a diagram illustrating a system in which presence of one or more private distributed ledgers of an enterprise network is advertised for exchanging data between private distributed ledgers associated with different enterprises, according to an example embodiment.

The system 500 involves the first enterprise 302 having the first unique identifier 303, the second enterprise 304 having the second unique identifier 305, the first distributed ledger 312a, the second distributed ledger 312b, the third distributed ledger 312c, and the fourth distributed ledger 312d, of FIG. 3. The system 500 further involves the first gateway 412a with the first distributed ledger address 414a and the first IPv4 address 416a and the second gateway 412b with second distributed ledger address 414b and the second IPv4 address 416b, of FIG. 4. The system 500 further involves a third gateway 412c having a third distributed ledger address 414c (e.g., 0X323) and a third IPv4 address 416c (e.g., B.E.E.F) associated with the third distributed ledger 312c.

The system 500 further involves a first network device 510 and a second network device 520 that establish communications 530. The first network device 510 resides within the realm of the first enterprise 302 and is part of a network of the first enterprise 302. The second network device 520 resides within the realm of the second enterprise 304 and is part of a network of the second enterprise 304. A network device may be any network node that is configured to provide connectivity to a network such as a router, a switch, an access point, a hub, a gateway, modem, etc. The network device provides network communications i.e., connects an enterprise network to an outside world or provides connectivity within an enterprise network.

In one example embodiment, communications 530 use Multi-Protocol Border Gateway Protocol (MP-BGP). That is, the first network device 510 and the second network device 520 are configured to communicate using the MP-BGP and have support for a network layer reachability information (NLRI). The NLRI includes distributed ledger instance reachability information and serves as an announcement 532 that a respective distributed ledger exists. This is provided by way of an example only and other network protocols are within the scope of this disclosure. A particular communication protocol being deployed depends on a particular use case scenario, and may involve internet protocols, data network protocols, cellular network protocols, and/or a local access network protocols.

In one example embodiment, the announcement 532 is generated by a respective gateway. For example, the first gateway 412a generates the announcement 532 to advertise presence of the first distributed ledger 312a. The announcement 532 is an advertisement or an informational announcement that includes the tuple that represents the distributed ledger instance i.e., <Enterprise UUID>: <Distributed Ledger Instance UUID> and the network address of the respective gateway. A particular network device is then used to announce the presence of the distributed ledger by advertising the reachable network address (IP address) of the gateway and the tuple having <Enterprise UUID>:<Distributed Ledger Instance UUID> that represents the distributed ledger instance.

In one example embodiment, the announcement 532 may include other tuples (new tuples) for advertising other distributed ledgers of an enterprise. In other words, the announcement 532 may be an aggregate of several tuples with a respective IP address of each gateway. In this case, the first network device 510 may aggregate several tuples and corresponding network addresses into the announcement 532 and transmit the aggregated tuples (the announcement 532) for advertisement of presence of various distributed ledger instances.

The announcement 532 is announced or advertised, using communications 530 such as MP-BGP, which is used for Internet routing and prefix announcements. In one example, the <Enterprise ID>:<Ledger ID> tuple is conveyed using BGP NLRI with a Type/Length/Value (TLV). The NLRI conveys information about a particular distributed ledger(s).

By way of an example, the first gateway 412a may generate the announcement 532 that includes a tuple having the first unique identifier 303 and first ledger unique identifier 314a of FIG. 3, and the first IPv4 address 416a. The announcement 532 includes [tuple <UUID A>: <UUID C> and "A.B.C.D."]. The announcement 532 may further include a new tuple generated by second gateway 412b. The new tuple includes the first unique identifier 303 and the second ledger unique identifier 314*b* of FIG. 3, i.e., <UUID A>: <UUID D> and further provides the second IPv4 address 416*b* ("A.B.E.F.").

The announcement 532 is transmitted to the first network device 510 (among other network devices within the enterprise network), which then advertises or announces the presence of the first gateway 412*a* (and the second gateway 412*b* if the new tuple is included) to the outside world i.e., externally. The second network device 520 receives the announcement 532 and learns about the presence or existence of the first distributed ledger 312*a* (and the second distributed ledger 312*b* when the new tuple is included). The second enterprise 304 may obtain permissions e.g., keys, codes, etc. to access data from the first distributed ledger 312*a* using the tuple and the first IPv4 address 416*a* and to access data from the second distributed ledger 312*b* using the new tuple and the second IPv4 address 416*b*.

In one example embodiment, a software element running MP-BGP on the first network device 510 and on the second network device 520 is connected to respective gateways. Using configuration, the first network device 510 and second network device 520 establish a connection to other MP-BGP capable network devices present in the network of a particular enterprise and announce the distributed ledger <Enterprise ID>:<Ledger ID> tuple. Using the existing MP-BGP mechanisms, appropriately configured network devices convey the information inside the network of the enterprise (other network devices of the enterprise network, not shown) and to the outside world (other appropriately configured network devices in other networks of other enterprises). The announcement 532 may be broadcast internally within the enterprise network e.g., advertise presence of first distributed ledger 312*a* to the second distributed ledger 312*b* and externally to other networks such as the internet e.g., advertise presence of first distributed ledger 312*a* to third distributed ledger 312*c* of the second enterprise 304.

For example, the third gateway 412*c* is a configured gateway device with a third IPv4 address 416*c* "B.E.E.F". The third gateway 412*c* generates the tuple information that includes <UUID B>: <UUID E> for the third distributed ledger 312*c* and provides it with the third IPv4 address 416*c* to the second network device 520. The second network device 520 sends the announcement 532 announcing the presence of the third distributed ledger 312*c* to the first network device 510. The information is installed within the NLRI routing table of the device and/or communicated to the first gateway 412*a* and the second gateway 412*b*. When information is destined for the third distributed ledger 312*c* from the first distributed ledger 312*a*, it can now be sent to the first gateway 412*a*. The first gateway 412*a* will encode the information and send it towards the third IPv4 address 416*c* of the third gateway 412*c* (B.E.E.F) via the first network device 510 and the second network device 520, for example.

It should be noted that information cannot be sent towards the fourth distributed ledger 312*d*, since there is no gateway system present within the network. In other words, the fourth distributed ledger 312*d* does not include a gateway and cannot be advertised to the outside world. The fourth distributed ledger 312*d* may have an oracle that only have internal distributed ledger address and cannot communicate outside the ledger. The oracle is not configured to perform network address translation and does not have a network address for visibility external to fourth distributed ledger 312*d*.

The techniques provided herein provide discoverability and reachability for private distributed ledger instances and/or permissioned public distributed ledgers. While LayerOne protocols and Connext.Network protocols function on the premise that public distributed ledger networks are accessible via a public network e.g., Internet, the techniques provided herein provide for discovery and reachability of distributed ledgers not accessible or readily available via the public network. The techniques presented herein enable identification, advertisement, and routing of information between distributed ledger instances whether public or private.

Figure 6:
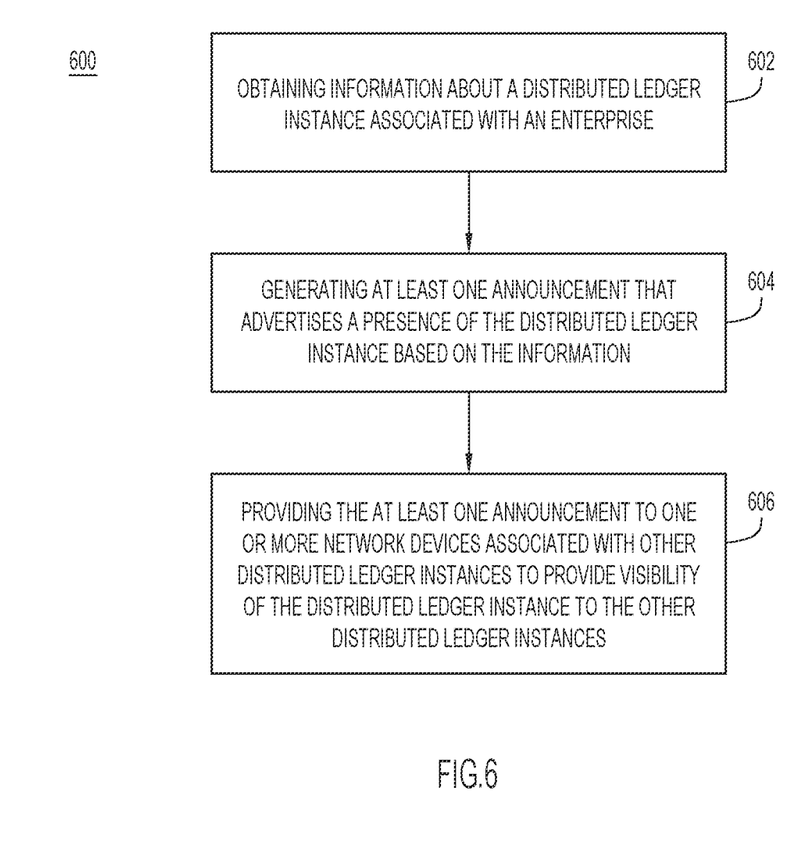
FIG. 6 is a flowchart illustrating a method of providing visibility of a distributed ledger instance to other distributed ledger instances, according to an example embodiment.

FIG. 6 is a flowchart illustrating a method 600 of providing visibility of a distributed ledger instance to other distributed ledger instances, according to an example embodiment, according to an example embodiment. The method 600 may be performed by a computing device such as a server or a group of servers or a network device.

The method 600 involves, at 602, obtaining information about a distributed ledger instance associated with an enterprise.

The method 600 further involves at 604, generating at least one announcement that advertises a presence of the distributed ledger instance based on the information.

Additionally, the method 600 involves at 606, providing the at least one announcement to one or more network devices associated with other distributed ledger instances to provide visibility of the distributed ledger instance to the other distributed ledger instances.

In one form, the method 600 may further include authenticating an access to data in the distributed ledger instance based on the at least one announcement and obtaining the data from the distributed ledger instance by another ledger instance of the other distributed ledger instances based on the access being authenticated.

In another form, the method 600 may further include providing first data from the distributed ledger instance to a particular ledger instance of the other distributed ledger instances, the particular ledger instance being a private ledger of another enterprise or obtaining, by the distributed ledger instance, second data from the particular ledger instance based on another announcement that includes an identification of the particular ledger instance and an address of an oracle associated with the particular ledger instance.

According to one or more example embodiments, the distributed ledger instance may be a first private ledger of the enterprise and is not accessible by the particular enterprise and the particular ledger instance may not be accessible by the enterprise.

According to one or more example embodiments, the information about the distributed ledger instance may include a first identifier of the enterprise and a second identifier of the distributed ledger instance.

In one instance, the method 600 may further involve communicating with an oracle associated with the distributed ledger instance using an IP address. The oracle may include a distributed ledger address for accessing the distributed ledger instance. The oracle may perform a network address translation between the IP address and the distributed ledger address.

In another instance, the operation 604 of generating the at least one announcement may include generating a network layer reachability information (NLRI) that includes a tuple having a first unique identifier of the enterprise and a second unique identifier of the distributed ledger instance.

In another form, the operation 606 of providing the at least one announcement to the one or more network devices may involve establishing a connection with the one or more network devices using multi-protocol border gateway protocol (MP-BGP) and transmitting the NLRI to the one or more network devices to advertise the presence of the distributed ledger instance to the other distributed ledger instances based on the tuple.

According to one or more example embodiments, the method 600 may further include generating a new tuple that includes the first unique identifier of the enterprise and a third unique identifier of another private distributed ledger instance associated with the enterprise. The NLRI may include the tuple and the new tuple.

In another instance, the method 600 may further include obtaining, from an oracle associated with a private ledger instance of the enterprise, identification information of the private ledger instance and aggregating the information and the identification information to generate the at least one announcement.

Figure 7:
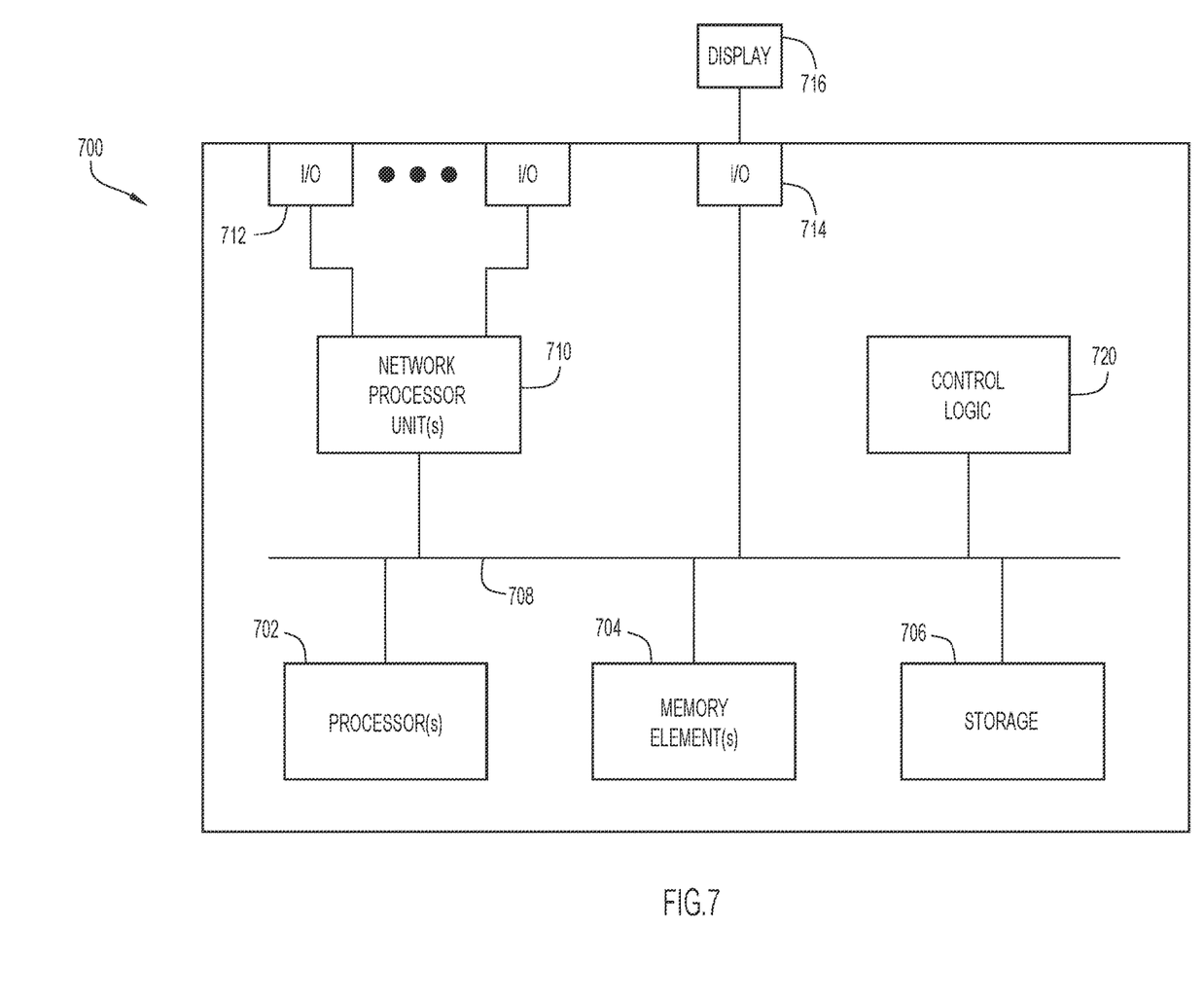
FIG. 7 is a hardware block diagram of a computing device that may perform functions associated with any combination of operations in connection with the techniques depicted and described in FIGS. 1-6, according to various example embodiments.

FIG. 7 is a hardware block diagram of a computing device 700 that may perform functions associated with any combination of operations in connection with the techniques depicted in FIGS. 1-6, according to various example embodiments, including, but not limited to, operations of the computing device or one or more servers that execute gateway, network device, and/or distributed ledger. The computing device 700 may be representative of one of the network devices, gateways, or hardware asset of an enterprise. It should be appreciated that FIG. 7 provides an illustration of one example embodiment and does not imply any limitations with respect to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including obtaining information about a distributed ledger instance associated with an enterprise and generating at least one announcement that advertises a presence of the distributed ledger instance based on the information. The operations further include providing the at least one announcement to one or more network devices associated with other distributed ledger instances to provide visibility of the distributed ledger instance to the other distributed ledger instances.

In yet another example embodiment, one or more non-transitory computer readable storage media encoded with instructions are provided. When the media is executed by a processor, the instructions cause the processor to execute a method that includes obtaining information about a distributed ledger instance associated with an enterprise and generating at least one announcement that advertises a presence of the distributed ledger instance based on the information. The method further includes providing the at least one announcement to one or more network devices associated with other distributed ledger instances to provide visibility of the distributed ledger instance to the other distributed ledger instances.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining information about a distributed ledger instance associated with an enterprise;
    generating at least one announcement that advertises a presence of the distributed ledger instance based on the information; and
    providing the at least one announcement to one or more network devices associated with other distributed ledger instances to provide visibility of the distributed ledger instance to the other distributed ledger instances.

2. The method of claim 1, further comprising:
    authenticating an access to data in the distributed ledger instance based on the at least one announcement; and
    obtaining the data from the distributed ledger instance by another ledger instance of the other distributed ledger instances based on the access being authenticated.

3. The method of claim 1, further comprising:
    providing first data from the distributed ledger instance to a particular ledger instance of the other distributed ledger instances, the particular ledger instance being a private ledger of another enterprise; or
    obtaining, by the distributed ledger instance, second data from the particular ledger instance based on another announcement that includes an identification of the particular ledger instance and an address of an oracle associated with the particular ledger instance.

4. The method of claim 3, wherein the distributed ledger instance is a first private ledger of the enterprise and is not accessible by the another enterprise and the particular ledger instance is not accessible by the enterprise.

5. The method of claim 1, wherein the information about the distributed ledger instance includes a first identifier of the enterprise and a second identifier of the distributed ledger instance.

6. The method of claim 1, further comprising:
    communicating with an oracle associated with the distributed ledger instance using an Internet Protocol (IP) address, wherein the oracle includes a distributed ledger address for accessing the distributed ledger instance and wherein the oracle performs a network address translation between the IP address and the distributed ledger address.

7. The method of claim 1, wherein generating the at least one announcement includes:
    generating a network layer reachability information (NLRI) that includes a tuple having a first unique identifier of the enterprise and a second unique identifier of the distributed ledger instance.

8. The method of claim 7, wherein providing the at least one announcement to the one or more network devices includes:
establishing a connection with the one or more network devices using multi-protocol border gateway protocol (MP-BGP); and
transmitting the NLRI to the one or more network devices to advertise the presence of the distributed ledger instance to the other distributed ledger instances based on the tuple.

9. The method of claim 8, further comprising:
generating a new tuple that includes the first unique identifier of the enterprise and a third unique identifier of another private distributed ledger instance associated with the enterprise, wherein the NLRI includes the tuple and the new tuple.

10. The method of claim 1, further comprising:
obtaining, from an oracle associated with a private ledger instance of the enterprise, identification information of the private ledger instance; and
aggregating the information and the identification information to generate the at least one announcement.

11. An apparatus comprising:
a memory;
a network interface configured to enable network communications; and
a processor, wherein the processor is configured to perform a method comprising:
obtaining information about a distributed ledger instance associated with an enterprise;
generating at least one announcement that advertises a presence of the distributed ledger instance based on the information; and
providing the at least one announcement to one or more network devices associated with other distributed ledger instances to provide visibility of the distributed ledger instance to the other distributed ledger instances.

12. The apparatus of claim 11, wherein the processor is further configured to perform an operation comprising:
authenticating an access to data in the distributed ledger instance based on the at least one announcement; and
obtaining the data from the distributed ledger instance by another ledger instance of the other distributed ledger instances based on the access being authenticated.

13. The apparatus of claim 11, wherein the processor is further configured to perform an operation comprising:
transmitting first data from the distributed ledger instance to a particular ledger instance of the other distributed ledger instances, the particular ledger instance being a private ledger of another enterprise; or
receiving, by the distributed ledger instance, second data from the particular ledger instance based on another announcement that includes an identification of the particular ledger instance and an address of an oracle associated with the particular ledger instance.

14. The apparatus of claim 13, wherein the distributed ledger instance is a first private ledger of the enterprise and is not accessible by the another enterprise and the particular ledger instance is not accessible by the enterprise.

15. The apparatus of claim 11, wherein the information about the distributed ledger instance includes a first identifier of the enterprise and a second identifier of the distributed ledger instance.

16. The apparatus of claim 11, wherein the processor is further configured to perform an operation comprising:
communicating with an oracle associated with the distributed ledger instance using an Internet Protocol (IP) address, wherein the oracle includes a distributed ledger address for accessing the distributed ledger instance and wherein the oracle performs a network address translation between the IP address and the distributed ledger address.

17. The apparatus of claim 11, where the processor is configured to generate the at least one announcement by:
generating a network layer reachability information (NLRI) that includes a tuple having a first unique identifier of the enterprise and a second unique identifier of the distributed ledger instance.

18. One or more non-transitory computer readable storage media encoded with software comprising computer executable instructions that, when executed by a processor, cause the processor to perform a method including:
obtaining information about a distributed ledger instance associated with an enterprise;
generating at least one announcement that advertises a presence of the distributed ledger instance based on the information; and
providing the at least one announcement to one or more network devices associated with other distributed ledger instances to provide visibility of the distributed ledger instance to the other distributed ledger instances.

19. The one or more non-transitory computer readable storage media according to claim 18, wherein the computer executable instructions cause the processor to further perform:
authenticating an access to data in the distributed ledger instance based on the at least one announcement; and
obtaining the data from the distributed ledger instance by another ledger instance of the other distributed ledger instances based on the access being authenticated.

20. The one or more non-transitory computer readable storage media according to claim 18, wherein the computer executable instructions cause the processor to further perform:
transmitting first data from the distributed ledger instance to a particular ledger instance of the other distributed ledger instances, the particular ledger instance being a private ledger of another enterprise; or
receiving, by the distributed ledger instance, second data from the particular ledger instance based on another announcement that includes an identification of the particular ledger instance and an address of an oracle associated with the particular ledger instance.

* * * * *